June 19, 1956     G. E. KAUFMAN     2,750,618
COMBINED HANDLE AND SWITCH CONTROL FOR SUCTION CLEANERS
Filed Oct. 27, 1952     5 Sheets-Sheet 1

INVENTOR.
GEORGE E. KAUFMAN
BY
ATTORNEY.

INVENTOR.
GEORGE E. KAUFMAN
BY
ATTORNEY.

INVENTOR.
GEORGE E. KAUFMAN
BY
ATTORNEY.

June 19, 1956 G. E. KAUFMAN 2,750,618
COMBINED HANDLE AND SWITCH CONTROL FOR SUCTION CLEANERS
Filed Oct. 27, 1952 5 Sheets-Sheet 4
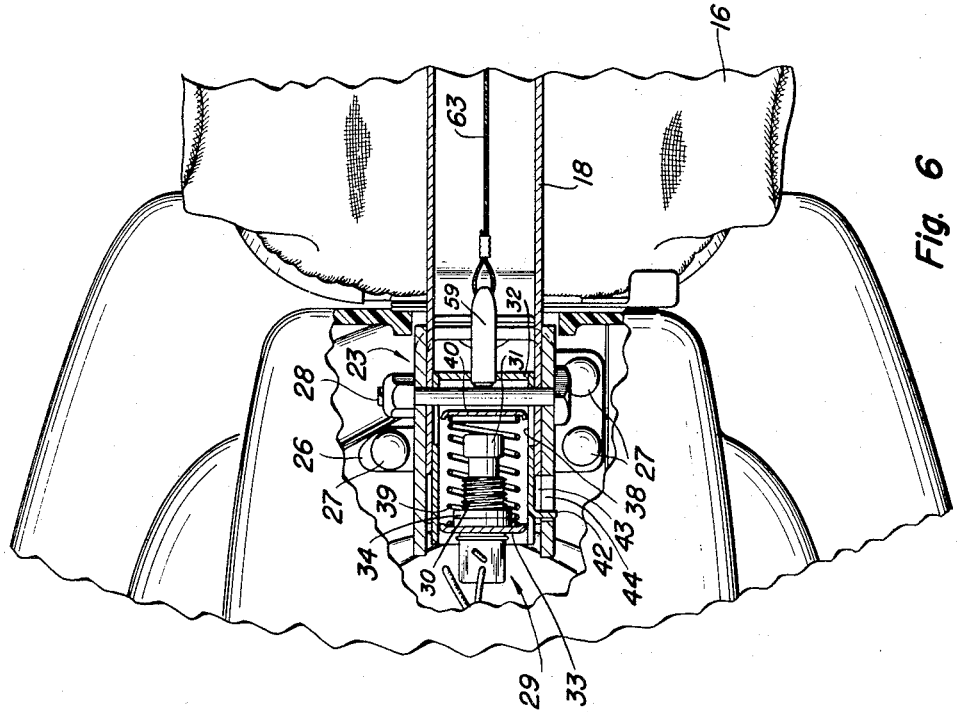
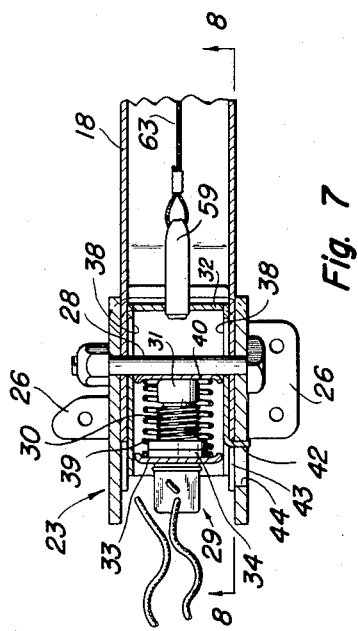
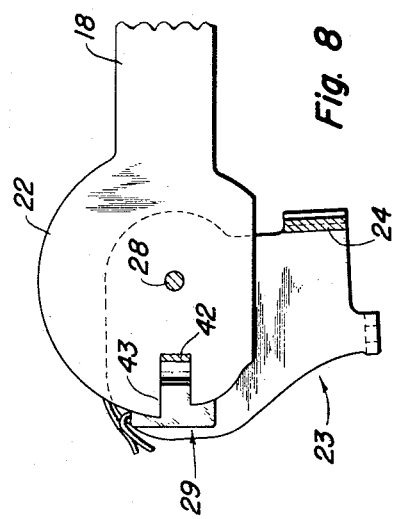
INVENTOR.
GEORGE E. KAUFMAN
BY
ATTORNEY.

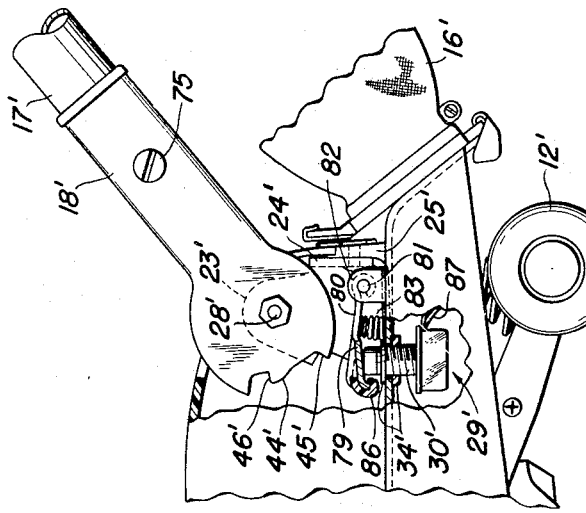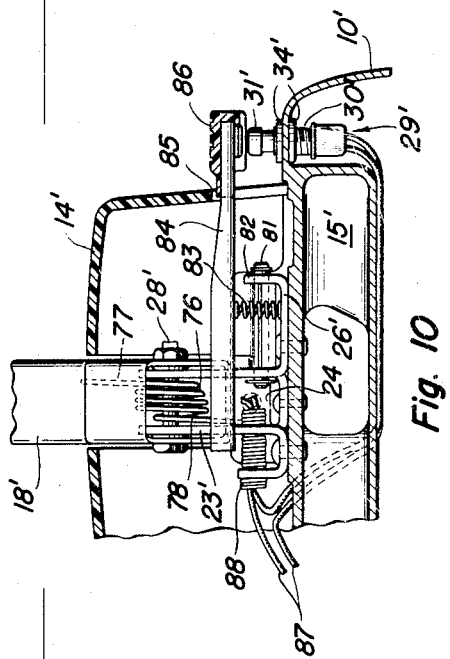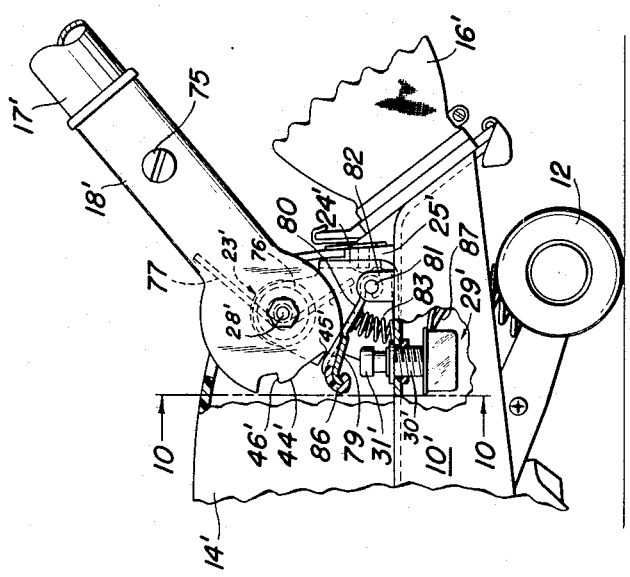

United States Patent Office 2,750,618
Patented June 19, 1956

2,750,618

COMBINED HANDLE AND SWITCH CONTROL FOR SUCTION CLEANERS

George E. Kaufman, Canton, Ohio, assignor to The Hoover Company, North Canton, Ohio, a corporation of Ohio Application October 27, 1952, Serial No. 317,068

8 Claims. (Cl. 15—410)

This invention relates to suction cleaners and more particularly to a unique unitary control for selectively operating the handle control device and the motor control switch.

Heretofore, the practice has been to provide controls for the motor and the propelling handle which are entirely independent of one another both structurally and functionally. Furthermore, each control and the operators therefor have been located at widely spaced points on the cleaner.

It is a principal purpose of the present invention to provide switch and handle control mechanisms arranged to be controlled at will by a common manual actuator conveniently located on the cleaner. According to one arrangement of the invention the actuator is located adjacent the hand grip at the end of the cleaner propelling handle. Other users may find it preferable to use the toe to operate the controls. To satisfy this preference, a second embodiment utilizes a foot operated actuator mounted at the base of the handle.

Accordingly, it is a principal object of this invention to provide a suction cleaner with an electric switch for the motor and a handle position control mechanism arranged to be selectively actuated by a common actuator.

A further object is the provision of new motor and handle control mechanisms of simplified and improved design featuring ruggedness, low cost and greater operating convenience.

Numerous other objects and advantages of the invention will become apparent from the foregoing detailed specification and drawings of illustrative embodiments in which:

Figure 6 is a sectional view along line 6—6 on Figure 5;

Figure 7 is a view similar to Figure 6 but showing the position of parts while the plunger for the push-push switch is held fully depressed;

Figure 8 is a view along line 8—8 on Figure 7 while the switch is held fully depressed;

Figure 9 is a fragmentary side view partly in section of a second embodiment of the invention and showing the cleaner propelling handle in its inclined operating position;

Figure 10 is a transverse sectional view along line 10—10 on Figure 9; and

Figure 11 is a view similar to Figure 9 but showing the position of the parts while the switch plunger is held fully depressed.

Figure 1:
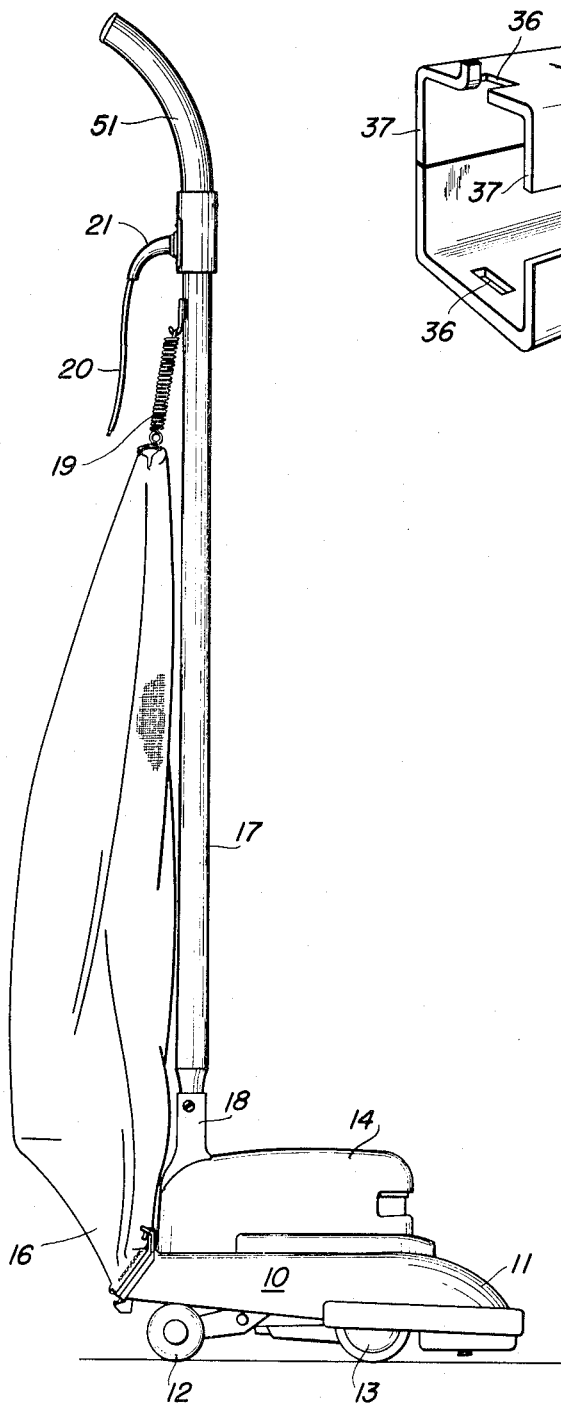
Figure 1 is a side view of a cleaner incorporating the invention.
Figure 4:
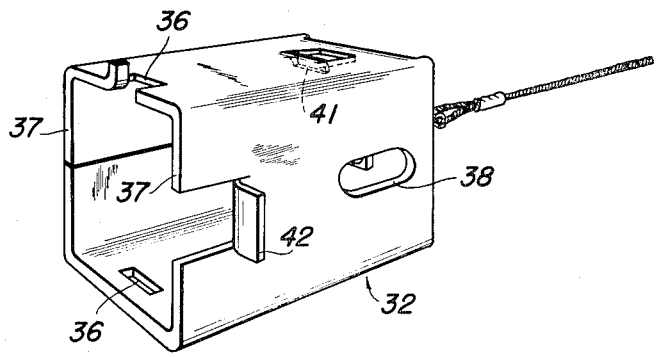
Figure 4 is an isometric view of the handle control detent and housing for the push-push switch assembly.

Referring now to the drawings for the first embodiment depicted in Figures 1 to 8, it will be noted that Figure 1 illustrates a conventional type floor cleaner having a main body 10 provided with a downwardly facing suction nozzle 11 at its forward end. This body is mounted on a pair of rear wheels 12 and a pair of front carrier wheels 13. Concealed beneath the removable hood 14 overlying the main body is a vertical axis electric motor to the lower end of which is coupled a suction fan in the usual manner. A suction passageway formed within the body leads from the suction nozzle 11 to the inlet of this fan while the discharge of the fan opens into the exhaust air duct 15 leading into the lower end of the filter bag assembly 16. A tubular propelling handle 17 has its lower end detachably held in a handle socket 18 pivotally supported at the rear upper side of the cleaner body as will be explained in detail presently. The upper end of filter assembly 16 is resiliently and detachably supported from the handle by a spring 19, while the usual electric service cord 20 extends through a strain relief 21 carried by the handle.

As clearly illustrated in Figures 5 to 8, handle socket 18 comprises a tube projecting from a cylindrical portion 22, the opposite ends of which fit closely between a U-shaped handle bracket generally indicated by 23. The web 24 of this bracket is riveted or otherwise secured to a flange 25 projecting upwardly from the wall of exhaust duct 15. The opposite sides of the bracket are provided with flanges 26 which are riveted to the top of the cleaner body as by rivets 27. The handle socket is assembled to bracket 23 by means of a through bolt 28 and about the axis of which the handle pivots from its vertical storage position to its lower horizontal operating position.

The electric motor (not shown) driving the suction fan is controlled by a conventional push-push type snap action switch generally indicated at 29. This well known switch opens and closes on successive depressions of the operating plunger. Projecting upwardly from the casing housing the switch proper is a threaded barrel 30 through which the reciprocable switch operating plunger 31 projects. Switch 29 is supported within a sheet metal housing 32 by means of a mounting plate 33 rigidly secured to the top of the switch casing by lock nuts 34. The opposite ends of this plate are provided with tabs 35 which project through openings 36 in the opposite side walls of housing 32. Side walls 37, 37 of the housing are provided with a pair of elongated openings 38, 38 to receive the handle pivot pin 28. Walls 37, 37 fit loosely between the interior side walls of handle socket 22. Due to this lose fit and the presence of elongated openings 38, 38, housing 32 has limited to and fro sliding movement axially of the propelling handle. Housing 32 is biased to occupy a normal position illustrated in Figure 2 wherein the handle pivot pin 28 is at the upper ends of slots 38. Housing 32 is spring biased to this position by means of a compression spring 39, the upper end of which rests against a freely movable plate 40 held 41, 41 struck from the side walls thereof. The lower end captive inside housing 32 by inturned stop forming tabs of the spring rests against mounting plate 33.

Figure 5:
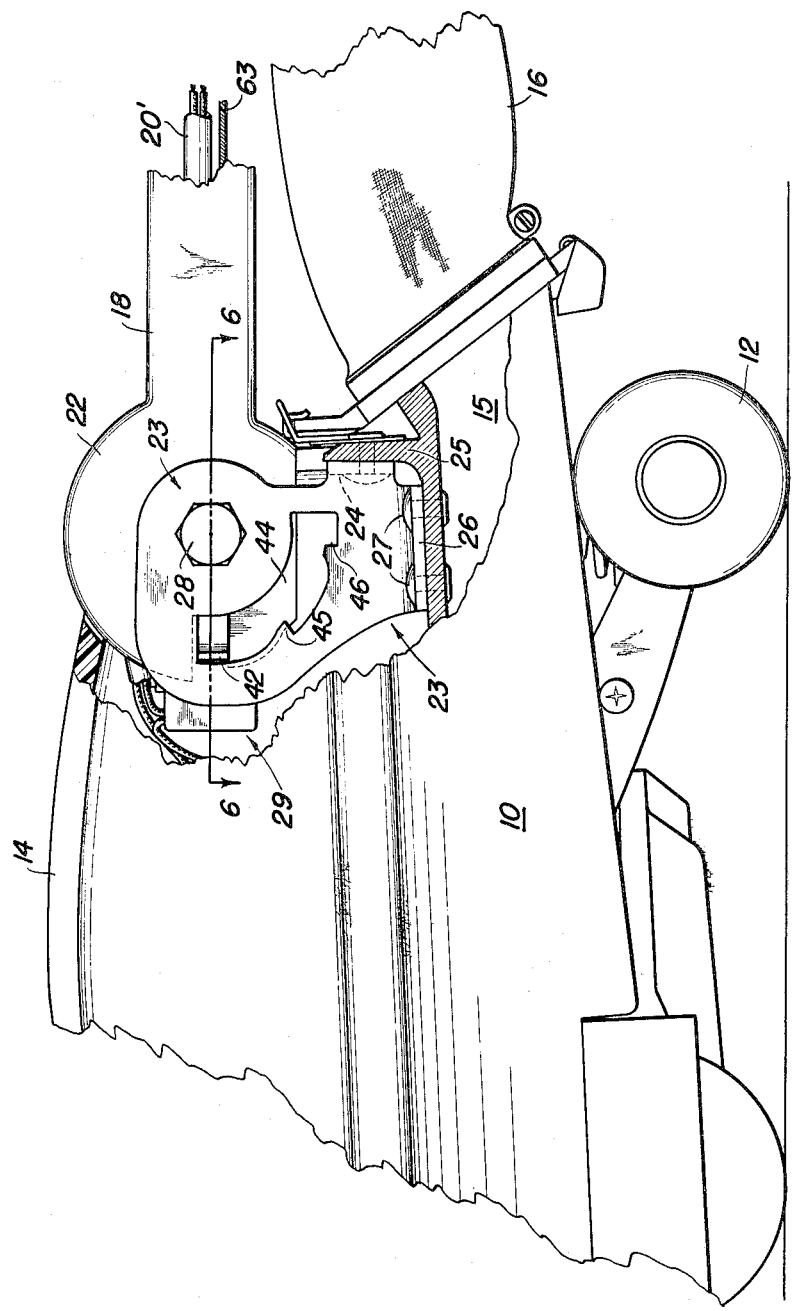
Figure 5 is a fragmentary view from the side of the handle mounting bracket and showing the handle in its lowermost horizontal position.

Projecting outwardly from the near side of housing 32 is a handle control detent tab 42 which projects laterally through a notched portion 43 of handle socket 22, as best illustrated in Figures 7 and 8. Tab 42 also projects through an arcuate slot 44 in the adjacent side of the handle supporting bracket 23. The lower edge of arcuate slot 44 is provided with a pair of stops 45 and 46, as best illustrated in Figure 5. Stop 45 cooperates with detent tab 42 to lock the handle against falling below its inclined rest position while stop 46 cooperates with the detent to lock the handle in its vertical storage position. The approaches to both stops are cammed in order to permit the handle detent to ride into the stops as it is elevated from positions below these stops. As soon as the detent over-rides the hump, spring 39 within housing 32 urges the housing to a position such that tab 42 seats behind either stop 45 or 46 depending upon the position of the handle.

Figure 3:
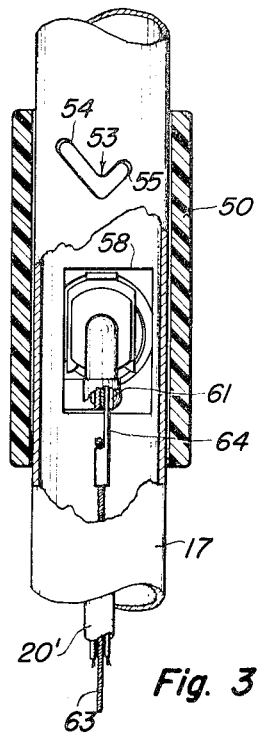
Figure 3 is a fragmentary view of the common actuator for the motor switch and handle control taken from the forward side of the handle as shown in Figure 2.
Figure 2:
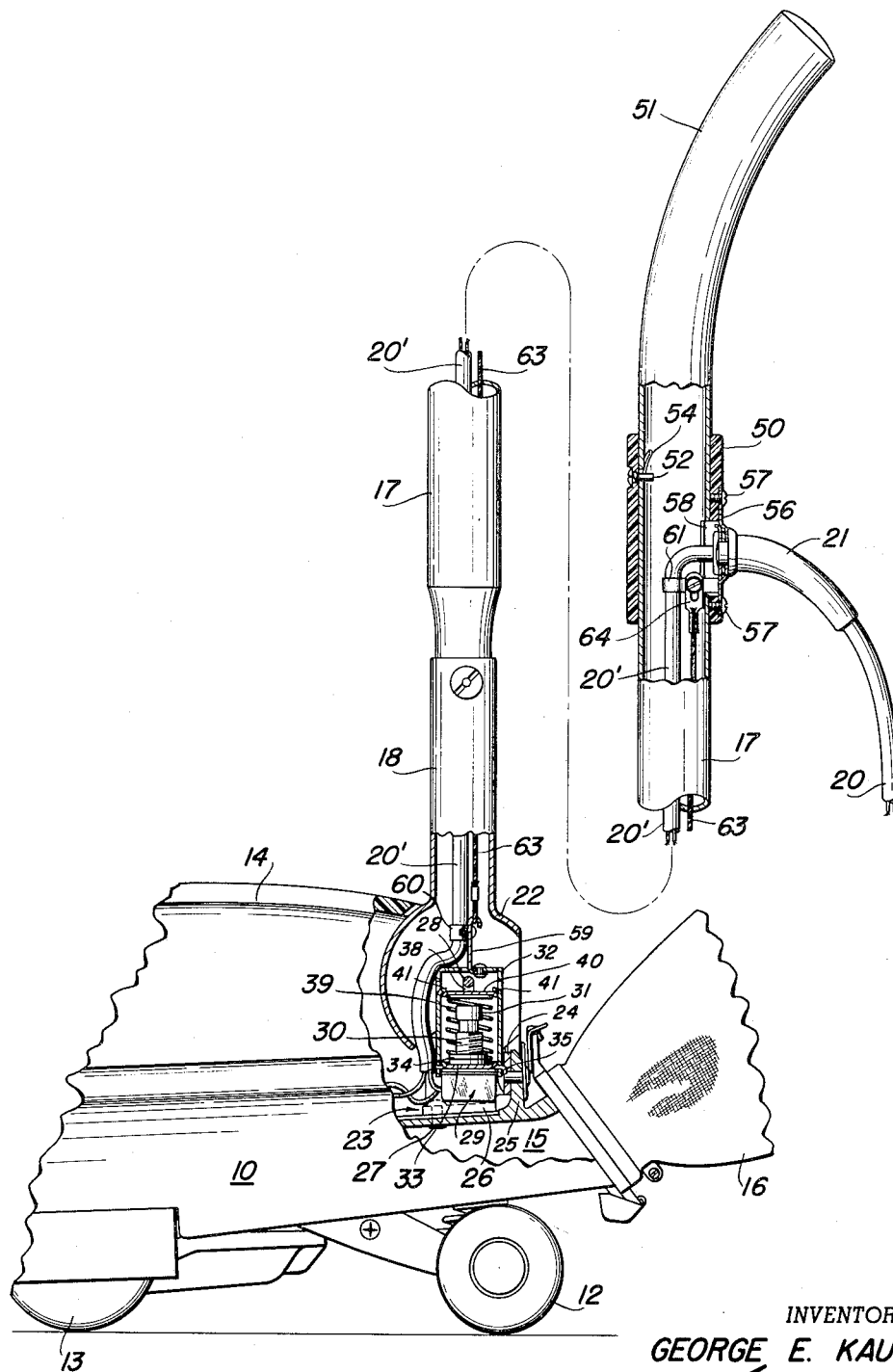
Figure 2 is a fragmentary view on a larger scale with parts of the handle broken away to show constructional details.

The common actuator for the switch and the handle control will be best understood by reference to Figures 2 and 3. This actuator comprises a sleeve 50 near handle grip 51 which is freely rotatable through limited arcs about the propelling handle 17. Anchored to this sleeve is a pin 52 which projects inwardly through a V-shaped slot 53 in the side wall of the handle. This slot has a long leg 54 which is about double the length of the shorter leg 55. Normally, sleeve 50 occupies a position such that pin 52 is seated in the lowermost portion of slot 53 due to the action of spring 39 in switch housing 32. It will also be obvious that if the sleeve is rotated in either direction, pin 52 will travel along one of the legs of the V-shaped slot and cause the sleeve to rise axially along the handle as it is rotated. If it is rotated into short leg 55, the sleeve will move upwardly a relatively short distance, while if it is rotated in the opposite direction and into long leg 54, the sleeve will rise a relatively greater distance along the handle. The shorter axial travel is employed to actuate the handle control, while the longer travel is utilized to actuate the push-push switch.

The strain relief 21 for service cord 20 has its upper end anchored to a plate 56 which, in turn, is secured to sleeve 50 by screws 57. The service cord extends through a wide opening 58 in the rear of the handle and downwardly therethrough. Its lower end is anchored by clamp 60 to a tab 59 riveted to the top of switch housing 32. The free end of the service cord below clamp 60 passes outwardly from the handle socket and into the cleaner body where its ends are connected in series circuit with switch 29 and the driving motor for the suction fan in the usual manner.

The portion 20' of the service cord within the propelling handle is held under slight tension and serves to transmit the axial movement of sleeve 50 to the switch and handle control mechanism. To this end, the upper end of portion 20' of the service cord is supported in a clamp 61 mounted on anchor plate 56 for the strain relief 21, as clearly illustrated in Figure 2. Under these circumstances it will be clear that if sleeve 50 is rotated either clockwise or counter-clockwise about the handle, pin 52 will ride upwardly along either leg 54 or 55 of the V-shaped notch 53. In so doing, portion 20' of the cord will move switch housing 32 axially of the handle in opposition to spring 39. As housing 32 moves crosswise of handle pivot pin 28 as permitted by slots 38, plate 40 will engage the underside of the pivot pin and compress spring 39. If housing 32 is raised only a short distance, detent tab 42 will be lifted above stop 46 (or stop 45) thereby unlocking the handle for rearward pivotal movement but plunger 31 will not be depressed to operate the switch. However, if pin 42 on the actuator sleeve is moved to the end of longer slot 54, housing 32 will be elevated to the position shown in Figure 7 in which plunger 31 of the switch is fully depressed to either open or close the switch contacts. As soon as the operator relaxes her grasp of sleeve 50, spring 39 returns both housing 32 and actuator sleeve 50 to their normal positions wherein pivot pin 28 is located at the upper end of slots 38 and pin 52 of the actuator sleeve is located at the apex of slot 53.

Under certain abnormal operating conditions excessive strains might be imposed on position 20' of the service cord while it is being employed to operate the control mechanisms. To avoid stretching and damage to the service cord, it may be desirable to employ an auxiliary flexible tension cable 63 connected in parallel therewith. In this event the lower end of the cable is connected to a loop at the top of tab 59 while its upper end is anchored to clamp 61 by means of a tab and set screw 64. Thus, cable 63 may supplement portion 20' of the service cord if the strength of the cord is found to be inadequate by itself or, if preferred, cable 63 may be employed as the sole or principal means for transmitting the movement of sleeve 50 to the switch and handle controls located at the base of the handle.

*Operation*

Let it be assumed that the cleaner is assembled and that the handle is in its parked position as shown in Figure 2. Under these circumstances, spring 39 acts to hold housing 32 in its normal position in which handle control detent 42 is seated in notch 43 of the handle bracket. Should the operator wish to lower the handle, she merely grasps actuator sleeve 50 and turns it so that pin 52 moves upwardly along shorter leg 55 of V-notch 53. This axial movement of the sleeve acts through portion 20' of the service cord to lift housing 32 vertically sufficiently to disengage detent 42 from notch 43 whereupon the handle may be pivoted rearwardly.

If the operator also wishes to turn on the cleaner motor, she rotates control sleeve 50 in the opposite direction so that pin 52 moves in the longer leg 54 of V-notch 53 so that housing 32 is elevated a much greater distance than formerly. As a result, plunger 31 of the switch is brought into contact with the underside of cover 40 and depressed to close the switch contacts. Of course, handle control detent 42 is being elevated simultaneously but this movement is of no consequence since the handle is already unlatched. As soon as the operator closes the switch, she relaxes her grasp of sleeve 50 whereupon spring 39 returns the sleeve and housing 32 to its normal neutral position. From the foregoing, it is obvious that the switch and handle control may be opearted simultaneously if the operator so wishes.

The cleaner can now be used in the normal manner as is well understood. If at any time the operator wishes to deenergize the motor, she merely turns the sleeve so that pin 52 moves along slot 54 causing plunger 31 to be fully depressed as required to open this well known type of push-push switch construction. If the operator relaxes her grasp of the handle, it will fall to an inclined rest position slightly below an angle of 45° whereupon detent 42 contacts stop 45 on the handle bracket and supports the handle in this position. If the operator wishes to move the handle below this inclined rest position, she turns the control sleeve so that pin 52 rides along shorter leg 55 of notch 53 and raises the detent 42 out of contact with stop 45.

From the foregoing it will be obvious that the motor switch control as well as the handle position control mechanism may be operated selectively at will from a convenient position at the upper end of the handle merely by turning the single actuator sleeve away from its neutral rest position. After either, or both of the controls have been operated, the actuator returns to its neutral position automatically as the operator relaxes her grasp.

*Second embodiment*

A simplified second embodiment is illustrated in Figures 9 to 11 wherein parts corresponding to those in the first embodiment are designated by the same reference characters distinguished by a prime. It will be understood that the cleaner is of the same type as described above and that the present fragmentary showings are confined to the area in which the principal differences occur. Thus, the propelling handle 17' is held in place in socket member 18' by a bolt and nut 75. The lower end of the socket is pivotally supported on the cleaner body by a U-shaped handle bracket 23' and a pivot pin 28'. The connecting back web 24' of this bracket is riveted to a wall 25' upstanding from the top rear corner of cleaner body 10'.

Surrounding pivot pin 28' is a torsion counter-balance spring 76 having one end 77 extending upwardly into the handle socket and bearing against the wall thereof in a direction to urge the handle upwardly to its vertical storage position. The other end 78 of the spring is anchored against a tab struck from the handle bracket 23'.

The handle control includes an arcuate control sector 44' along the opposite sides of handle socket 18'. Each of these arcuate surfaces is provided with a pair of stops 45' and 46' which cooperate with a detent 79 extending transversely of the cleaner and carried on a lever 80 pivotally supported on the cleaner body by a pivot pin 81. Thus, the rearmost end of lever 80 is journaled on a pin 81 extending transversely of the cleaner body and having one end supported in a side wall of bracket 23' and its other end supported in a tab 82 struck up from foot 26' of the bracket. This lever is urged to rotate upwardly about the pivot by a spring 83 bearing against the underside of the lever and having its other end supported by the cleaner body. Normally, the spring causes the upper surface of detent 79 to ride along arcuate surfaces 44' until it comes opposite one of the stops 45' or 46'. In this event, spring 83 causes the lever to rotate upwardly until detent 79 is seated at the base of one of the stops. When so seated, the handle cannot rotate rearwardly to a lower position.

Projecting laterally from the forward end of lever 80 is an arm 84 which extends through an opening 85 in the side of motor hood 14'. The outer end of this arm is provided with a pedal 86 which is conveniently positioned to be engaged by the operator's toe as she stands in the normal operating position at the rear of the cleaner.

Projecting through the top of a skirt along the side of the cleaner body 10' is the barrel 30' of a conventional push-push switch 29'. This switch is held assembled to the cleaner casing by lock nuts 34'. The switch includes a reciprocal plunger 31'. As made clear by Figures 9 to 11, this plunger is spaced sufficiently below pedal 86 to permit the handle to be unlatched without depressing the plunger and operating the switch. This switch is connected in series circuit with the motor and the service cord through connector wires 87. One pair of wire ends is connected to the motor while the other pair pass through a spiral wire protector 88 carried by the handle bracket and upwardly through the hollow handle.

Operation

The operation of the second embodiment will be fairly obvious from the foregoing description and from the detailed description of the first embodiment. When the propelling handle is in the inclined position shown in Figure 9, spring 83 holds the pedal upwardly so that detent 79 rides along the arcuate surfaces 44' on the end of the handle socket. If the handle is pivoted upwardly a few degrees beyond the position shown in Figure 9, detent 79 will move upwardly in front of stop 45'. Hence, if the handle is again lowered, it will engage behind detent 79 and support the handle in its inclined rest position.

If the switch is in open position and the operator desires to energize the motor, she merely steps upon pedal 86 and depresses the plunger 31' to close the switch contact and energize the motor. As soon as she releases her foot from the pedal, spring 83 returns the pedal to its position in contact with the control sector. Whenever she wishes to stop the motor, she merely steps on the pedal to again depress the plunger and open the switch contacts.

Whenever the handle is elevated to its vertical position, spring 83 moves lever 80 and detent 79 into contact with stop 46' to lock the handle in storage position. To unlock the handle the operator merely manually depresses the pedal the slight amount necessary to lower detent 79 out of engagement with stop 46' and then pivots the handle rearwardly. If she wishes to energize the motor at the same time, she manually depresses pedal 86 to an additional extent sufficient to depress plunger 31' and operate the switch.

From the foregoing detailed description of two illustrated embodiments of the invention, it will be appreciated that the principles of the invention may be carried out by structures differing materially from one another. Furthermore, it will be obvious that the common actuator for both the switch and the handle control mechanism may be conveniently located for manual operation either by the operator's foot or by her hand.

While I have shown and described but two embodiments of my invention, it is to be understood that those embodiments are to be taken as illustrative only and not in a limiting sense. I do not wish to be limited to the particular structure shown and described but to include all equivalent variations except as limited by the scope of the claims.

I claim:

1. In combination, a suction cleaner having a wheel supported main body, a motor-driven suction fan thereon, a propelling handle pivotally supported on said cleaner, handle control means for holding said handle against downward pivotal movement from a predetermined non-propelling position thereof, a switch for controlling the operation of the motor for said suction fan, and means for selectively actuating said handle control means or said switch and said handle control means including a common manually operated actuator.

2. In combination, a suction cleaner having a wheel supported main body, a motor-driven suction fan thereon, a propelling handle pivotally supported on said cleaner for movement between an upright storage position rearwardly through a cleaner propelling range of movement, movable control means for locking said handle in said upright storage position when it is raised thereto, an electric switch connected in circuit with said motor for controlling the operation thereof, manually operable means carried by said cleaner operatively connected to said switch and to said handle control means, said manually operable means having two ranges of movement in one of which it is operable to actuate said switch and handle control means and in the other of which it is operable to actuate said handle control means.

3. In a suction cleaner of the type having a main body supported for ambulatory movement on the floor, a suction nozzle on said body, a motor-driven suction fan on said body in communication with said suction nozzle, a propelling handle pivotally supported on said cleaner for movement from an upright parked position rearwardly and downwardly through a cleaner propelling range of movement, that improvement which comprises an electric switch movable between open and closed positions for controlling the operation of said motor, handle control means for locking said handle in the upright parked position thereof, movable means carried by said cleaner operable when actuated through one range of movement to operate said handle control means and to operate said electric switch between the open and closed positions thereof, said movable means being operable when moved through a second range of movement to unlock said handle control means, and a common manually operable actuator for selectively moving said movable means through said two ranges of movement thereof.

4. In a suction cleaner of the type having a main body supported for ambulatory movement over a floor, said body having a suction nozzle at its forward end, a motor-driven suction fan on said body having an inlet in communication with said nozzle, a propelling handle pivoted to said cleaner for movement from an upright parked position rearwardly through a cleaner propelling range of movement, that improvement which comprises providing control means for locking said handle in the parked position thereof including a detent movable to a position releasing said handle for free pivotal movement, an electric switch for opening and closing a power circuit for said motor, and common actuating means for said switch and for said movable handle detent operable through a relatively short and a relatively long range of movement in one of which said detent is operated and in the other of which both said switch and said detent are operated.

5. In a suction cleaner as defined in claim 4 wherein said common actuating means for said switch and for said movable detent is mounted on said cleaner in a convenient position to be operated by the foot of the operator.

6. In a suction cleaner as defined in claim 4 wherein said common actuating means for said switch and for said movable detent is mounted on said propelling handle in a convenient position to be operated by the hand of the operator.

7. That improvement in a motor-driven suction cleaner of the type having an ambulatory main body provided with a pivoting propelling handle which comprises an electric switch mounted near the lower end of the handle and connected in circuit with said motor, a first operating member for opening and closing said switch, control means between the lower end of said handle and the cleaner for locking said handle against rearward pivotal movement from a predetermined position thereof, a second operating member for actuating said control means to unlock said handle, and a common manually actuated member for said first and second operating members which is selectively operable to actuate one or both of said operating members.

8. That improvement in a motor-driven suction cleaner of the type having an ambulatory main body provided with a pivoting propelling handle which comprises an electric switch connected in circuit with said motor, and having a control for opening and closing the same, a control sector associated with the lower end of said propelling handle and including a movable member between said handle and control sector for locking said handle against rearward pivotal movement, a pedal pivotally supported on said cleaner and having a path of movement which includes both the path of movement of the control for opening and closing said switch and the path of movement of the movable member for locking said handle against rearward pivotal movement.

References Cited in the file of this patent

UNITED STATES PATENTS

| | | |
|---|---|---|
| 1,920,624 | Bilde | Aug. 1, 1933 |
| 2,077,511 | Breese | Apr. 20, 1937 |